(12) United States Patent
Kuwada et al.

(10) Patent No.: US 11,383,769 B2
(45) Date of Patent: Jul. 12, 2022

(54) REAR VEHICLE-BODY STRUCTURE OF VEHICLE

(71) Applicant: MAZDA MOTOR CORPORATION, Hiroshima (JP)

(72) Inventors: Kyohei Kuwada, Aki-gun (JP); Tsuneki Shimanaka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 82 days.

(21) Appl. No.: 17/118,266

(22) Filed: Dec. 10, 2020

(65) Prior Publication Data

US 2021/0221445 A1 Jul. 22, 2021

(30) Foreign Application Priority Data

Jan. 16, 2020 (JP) .............................. JP2020-005031

(51) Int. Cl.
| | |
|---|---|
| *B62D 25/20* | (2006.01) |
| *B62D 25/08* | (2006.01) |
| *B62D 25/02* | (2006.01) |
| *B62D 21/11* | (2006.01) |
| *B62D 25/04* | (2006.01) |
| *B62D 21/15* | (2006.01) |

(52) U.S. Cl.
CPC .......... *B62D 25/2027* (2013.01); *B62D 21/11* (2013.01); *B62D 25/025* (2013.01); *B62D 25/04* (2013.01); *B62D 25/08* (2013.01); *B62D 21/152* (2013.01)

(58) Field of Classification Search
CPC .. B62D 25/2057; B62D 25/025; B62D 25/04; B62D 25/08; B62D 21/11; B62D 21/152
USPC ................... 296/203.01, 4, 193.08, 204, 198
See application file for complete search history.

(56) References Cited

U.S. PATENT DOCUMENTS

2010/0171340 A1* 7/2010 Yasuhara ........... B62D 25/2018
296/205

FOREIGN PATENT DOCUMENTS

JP 2013163470 A 8/2013

* cited by examiner

*Primary Examiner* — Dennis H Pedder
(74) *Attorney, Agent, or Firm* — Studebaker & Brackett PC

(57) ABSTRACT

A rear vehicle-body structure for increasing support rigidity for a rear suspension and consequently increase steering stability. The rear vehicle-body structure includes a first frame extending to connect a rear end lower portion of a combined body composed of a side sill and a pillar and a lower arm front support portion of a rear side housing, and having therein a closed cross-sectional space; a second frame extending to connect a rear end lower portion of a floor tunnel located at a vehicle-width-direction center portion of a vehicle-body bottom portion and bulging toward a vehicle upper side in a vehicle front-rear direction and the lower arm front support portion and having therein a closed cross-sectional space; and a third frame extending to connect a rear end upper portion of the floor tunnel and the lower arm front support portion, and having therein a closed cross-sectional space.

20 Claims, 6 Drawing Sheets

REAR VEHICLE-BODY STRUCTURE OF VEHICLE

BACKGROUND

Technical Field

The present disclosure relates to a rear vehicle-body structure of a vehicle, including, for example, a suspension support portion supporting a rear suspension, a side sill extending in a vehicle front-rear direction on a vehicle front side relative to the suspension support portion and on each side of a vehicle-body bottom portion, and a floor tunnel bulging toward a vehicle upper side from a vehicle-width-direction center portion of the vehicle-body bottom portion and extending in the vehicle front-rear direction.

Background Art

Vehicles such as sports cars require increased support rigidity for a rear suspension to increase vehicle steering stability. A structure with increased support rigidity for a rear suspension has been proposed, which is exemplified in Japanese Patent Laid-Open No. 2013-163470, as one of rear vehicle-body structures of a vehicle including a suspension support portion, a side sill, and a floor tunnel as described above.

The rear vehicle-body structure disclosed in Japanese Patent Laid-Open No. 2013-163470 includes a rear suspension tower (suspension tower) as a suspension support portion, and also includes a rear reinforcement frame (30) extending from an upper rear end of a floor tunnel toward a vehicle rear side such that the frame is curved toward a vehicle-width-direction outer side as it goes toward the rear side and having its rear end connected to a damper top of the suspension tower. This structure gives increased support rigidity for the damper top of the rear suspension.

Generally, however, during traveling of the vehicle, large load is particularly input to a lower arm support portion, among portions of a rear suspension support portion, as the lower arm support portion supports a lower arm that is directly connected to a rear wheel.

In this regard, Japanese Patent Laid-Open No. 2013-163470 does not disclose providing the structure disclosed therein with a reinforcement frame and the like to connect the rear end of the floor tunnel and a support portion (lower arm support portion) supporting a lower arm of the rear suspension. Japanese Patent Laid-Open No. 2013-163470 thus leaves room for improving support rigidity for the lower arm.

Hence, the present inventors have focused on the fact that large load is particularly input to the lower arm support portion among portions of the rear suspension support portion during traveling of the vehicle, as described above, and conceived of making a truss structure by connecting the three points of the lower arm support portion, a rear end of the side sill, and a rear end lower portion of the floor tunnel with frame members and the like.

Although this truss structure ensures support rigidity in the vehicle front-rear direction and the vehicle width direction, increasing support rigidity in the vehicle up-down direction is left for further consideration.

SUMMARY

Accordingly, the present disclosure provides a rear vehicle-body structure of a vehicle that can increase support rigidity for a rear suspension and consequently increase steering stability.

The present disclosure provides a rear vehicle-body structure of a vehicle. The rear vehicle-body structure includes a rear side housing provided with a lower arm support portion for supporting a lower arm of a rear suspension; a side sill extending in a vehicle front-rear direction on each side of a vehicle-body bottom portion disposed on a vehicle front side relative to the rear side housing; a pillar extending in a vehicle up-down direction and having a lower portion thereof joined to the side sill; a floor tunnel located at a vehicle-width-direction center portion of the vehicle-body bottom portion and bulging from the vehicle-body bottom portion toward a vehicle upper side and extending in the vehicle front-rear direction; and a first frame extending so as to connect the lower arm support portion and a rear end lower portion of a combined body composed of the side sill and the pillar. The first frame has therein a closed cross-sectional space in an extending direction of the first frame. The rear vehicle-body structure also includes a second frame extending so as to connect a rear end lower portion of the floor tunnel and the lower arm support portion. The second frame has a closed cross-section portion in an extending direction of the second frame. The rear vehicle-body structure further includes a third frame extending so as to connect a rear end upper portion of the floor tunnel and the lower arm support portion. The third frame has a closed cross-section portion in an extending direction of the third frame.

With the above configuration, load in the vehicle front-rear direction and in the vehicle width direction that is included in the load input to the rear side housing via the lower arm support portion during traveling of the vehicle can be received by a virtual truss structure having the first frame and the second frame, and also load in the vehicle up-down direction that is included in the above load input to the rear side housing can be received by a virtual truss structure having the second frame and the third frame.

Thus, the above configuration can increase support rigidity for the lower arm support portion, to which a larger load is input than to an upper arm support portion during traveling of the vehicle.

In one aspect of the present disclosure, a floor tunnel rear end side edge portion is provided on each side in a vehicle width direction of a rear end of the floor tunnel, wherein the floor tunnel rear end side edge portion extends in the vehicle up-down direction so as to connect the rear end upper portion and the rear end lower portion of the floor tunnel, and the floor tunnel rear end side edge portion, the second frame, and the third frame constitute a truss structure.

In one aspect of the present disclosure, the above configuration can further increase support rigidity particularly against load in the vehicle up-down direction that is included in the load input to the rear side housing via the lower arm support portion during traveling of the vehicle.

In one aspect of the present disclosure, a cross member is provided that extends in the vehicle width direction so as to connect the rear end lower portion of the floor tunnel and the rear end lower portion of the combined body and has therein a closed cross-sectional space in the vehicle width direction, wherein the cross member, the first frame, and the second frame constitute a truss structure.

The above configuration can further increase support rigidity particularly against load in the vehicle front-rear direction and in the vehicle width direction that is included in the load input from the lower arm to the rear side housing via the lower arm support portion during traveling of the vehicle.

In one aspect of the present disclosure, a pair of left and right third frames are provided in a left-right integrated frame member, and the left-right integrated frame member is formed of a single member.

The above configuration allows the left-right integrated frame member to be formed without providing a joining portion for joining the pair of left and right third frames, and this allows the load input from the lower arm to the lower arm support portion during traveling of the vehicle to be effectively transmitted toward the vehicle front side via the left-right integrated frame member.

In one aspect of the present disclosure, a backbone frame is disposed on a top face of the floor tunnel, the backbone frame extending in the vehicle front-rear direction along the top face, and a front end of the left-right integrated frame member is connected to a rear end of the backbone frame.

The above configuration allows the load input from the lower arm of the rear suspension to the lower arm support portion during traveling of the vehicle to be transmitted to the backbone frame from the left-right integrated frame member.

In one aspect of the present disclosure, the left-right integrated frame member includes a connecting portion connecting front ends of the pair of left and right third frames in the vehicle width direction. The connecting portion is formed in a curved shape with a center portion thereof in the vehicle width direction being curved toward the vehicle front side in vehicle plan view. The connecting portion of the left-right integrated frame member is supported by a rear end of the floor tunnel via a bracket, and the bracket includes a receiving portion for receiving the connecting portion, and the receiving portion is formed in a curved shape conforming to the curved shape of the connecting portion.

With the above configuration, the connecting portion is formed in the curved shape and the receiving surface is formed in a curved shape conforming to that curved shape, and this allows the receiving surface to firmly receive the connecting portion while being in contact therewith along the curved shape.

The present disclosure not only improves side collision performance but also improves front-end collision load transfer performance of a tunnel portion.

DETAILED DESCRIPTION

An embodiment of the present disclosure will be described with reference to the drawings.

A vehicle in the present embodiment is a sports car that has a so-called space frame structure in which multiple extruded aluminum alloy frames are connected to form vehicle-body frames and also has a center pillar-less structure with two side doors. A rear vehicle-body structure of such a vehicle will be described using FIGS. 1 to 6. As the rear vehicle-body structure of the vehicle of the present embodiment is symmetrical in shape, the below description will focus on a structure in the right side of the vehicle. In FIG. 6, illustration of a floor tunnel 81 and a backbone frame 85 has been omitted.

Figure 1:
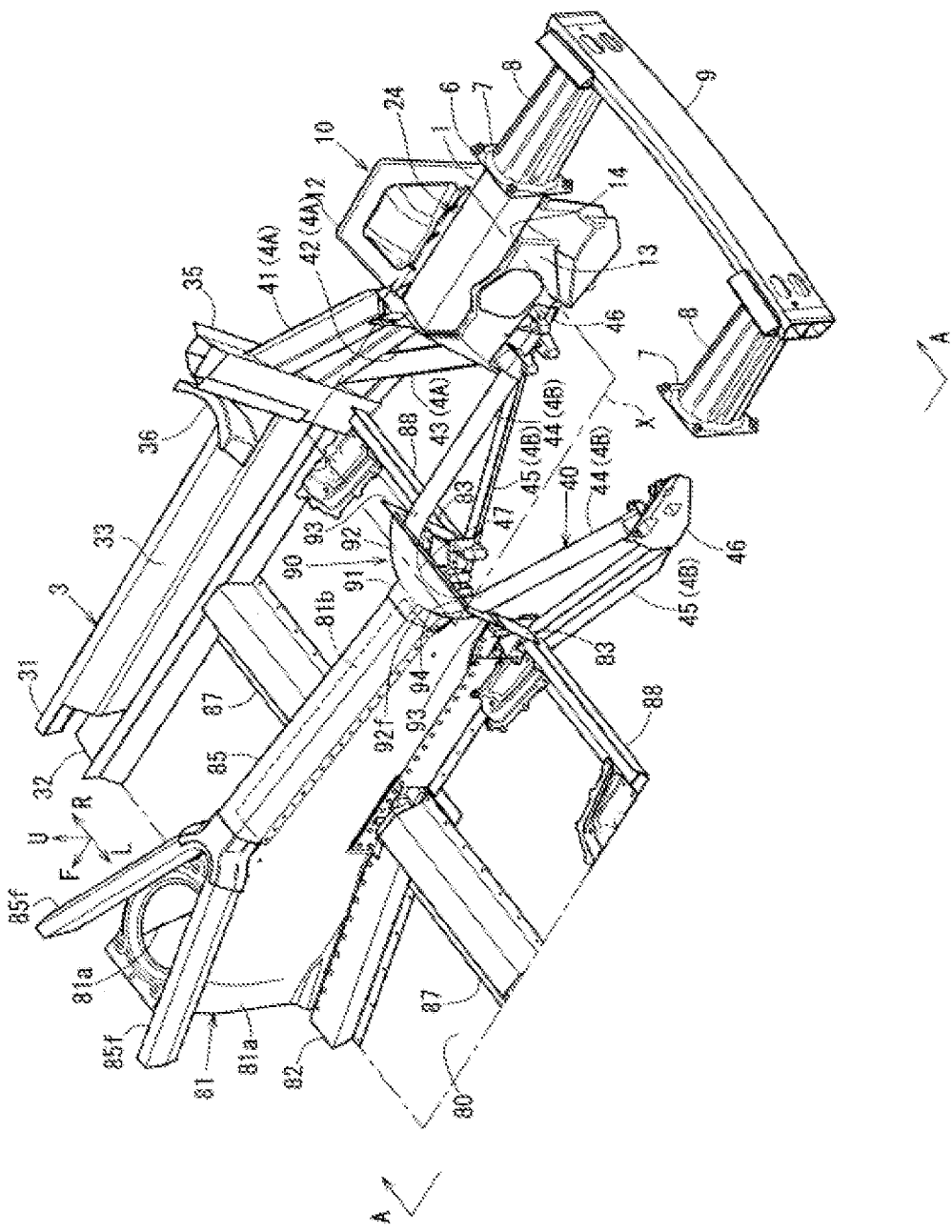
FIG. 1 is a perspective view of major parts of a vehicle having a rear vehicle-body structure of the present embodiment as viewed from a rear upper side.

Also, for the sake of clear illustration, rear suspensions, rear wheels and the like have been omitted in the figures and, in FIGS. 1 and 6, detailed illustration of lower arm support portions 21a, 21b (lower arm front support portion 21a and lower arm rear support portion 21b), an upper arm support portion 22, and a damper support portion 23 has been omitted.

In the figures, an arrow F represents a vehicle frontward direction, an arrow R represents a vehicle rightward direction, an arrow L represents a vehicle leftward direction, and an arrow U represents a vehicle upward direction.

As shown in FIG. 1, the vehicle having the rear vehicle-body structure of the present embodiment includes, on each of its left and right sides, double wishbone rear suspensions corresponding to respective left and right rear wheels, and the rear suspension includes a rear suspension damper, an upper arm, and a lower arm, though not shown in the figures.

The vehicle having the rear vehicle-body structure of the present embodiment is provided with a floor panel 80 forming a bottom face of a vehicle cabin and also provided with a floor tunnel 81 as a tunnel portion located at substantially the center in a vehicle width direction and extending in a front-rear direction of the vehicle and bulging upward, i.e., toward the vehicle cabin.

The floor tunnel 81 is integrally formed of left and right side walls 81a and a top deck portion 81b on a top side so as to form a gate shape and is mainly responsible for vehicle-body rigidity. A pair of tunnel members 82 are formed at a corner between a top face of the floor panel 80 and the respective side wall 81a of the floor tunnel 81.

The tunnel member 82 has a closed cross-sectional space extending in the vehicle front-rear direction between the respective side wall 81a of the floor tunnel 81 and the top face of the floor panel 80. While in the present embodiment the tunnel member 82 is formed from a front end of the floor tunnel 81 up to an intermediate portion thereof in the vehicle front-rear direction, this is not by way of limitation and the tunnel member 82 may also be formed up to a rear end of the floor tunnel 81 (not shown in the figures).

Figure 2:
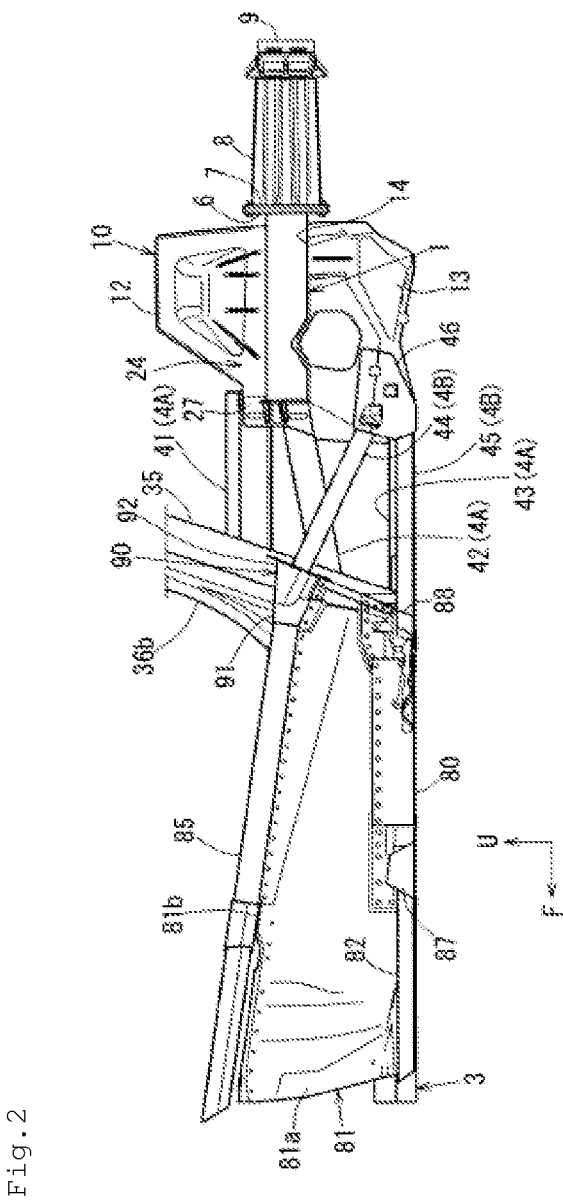
FIG. 2 depicts a view as viewed in the direction of an arrow A in FIG. 1.
Figure 4:
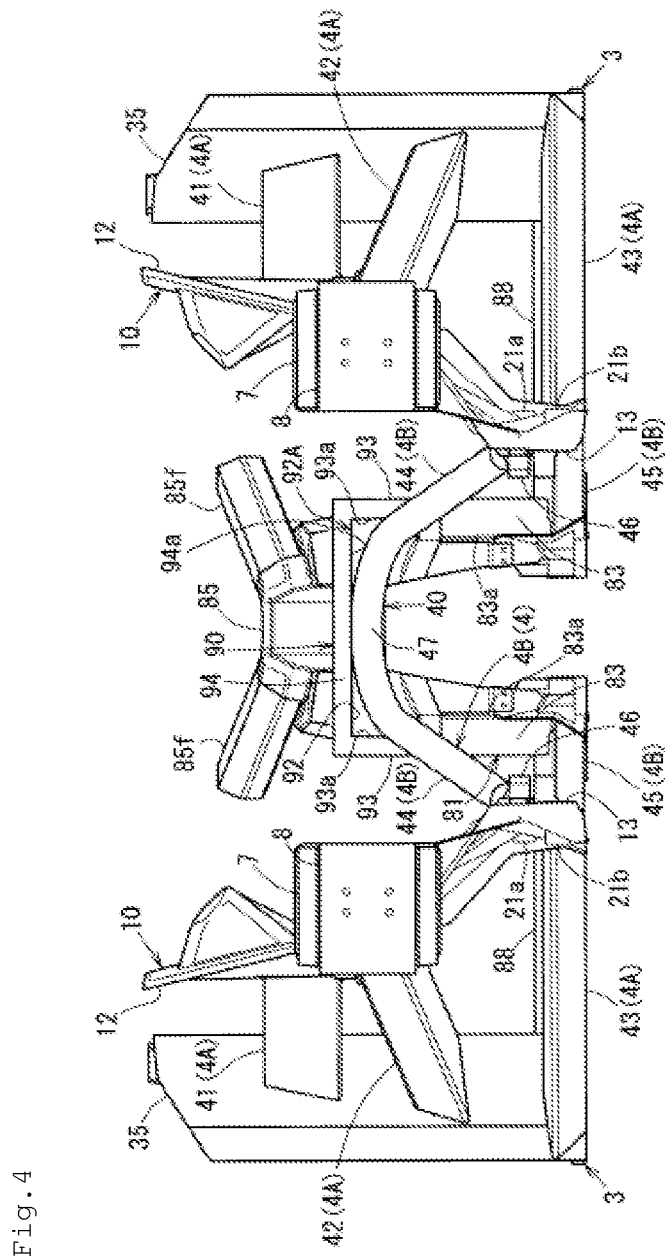
FIG. 4 is a back view of major parts of the vehicle having the rear vehicle-body structure of the present embodiment.

The top deck portion 81b of the floor tunnel 81 extends linearly in a vehicle up-down direction and, as shown in FIG. 2, is slanted such that its height increases as it goes toward the vehicle front side. As shown in FIG. 4, the floor tunnel 81 is formed such that its cross-section perpendicular to the vehicle front-rear direction defined by the pair of left and right side walls 81a and the top deck portion 81b is gate-shaped as described above, and the rear end of the floor tunnel 81 is opened toward the vehicle rear side (see FIG. 4). However, as shown in FIG. 2, a rear portion of the side wall 81a is extended toward the vehicle rear side farther than a rear end of the top deck portion 81b, and this extended portion extends toward a vehicle-width-direction outer side as it goes toward the vehicle rear side. Hence, the rear portions of the pair of left and right side walls 81a are formed such that they are more apart from each other in the vehicle width direction as they go toward the vehicle rear side.

Figure 3:
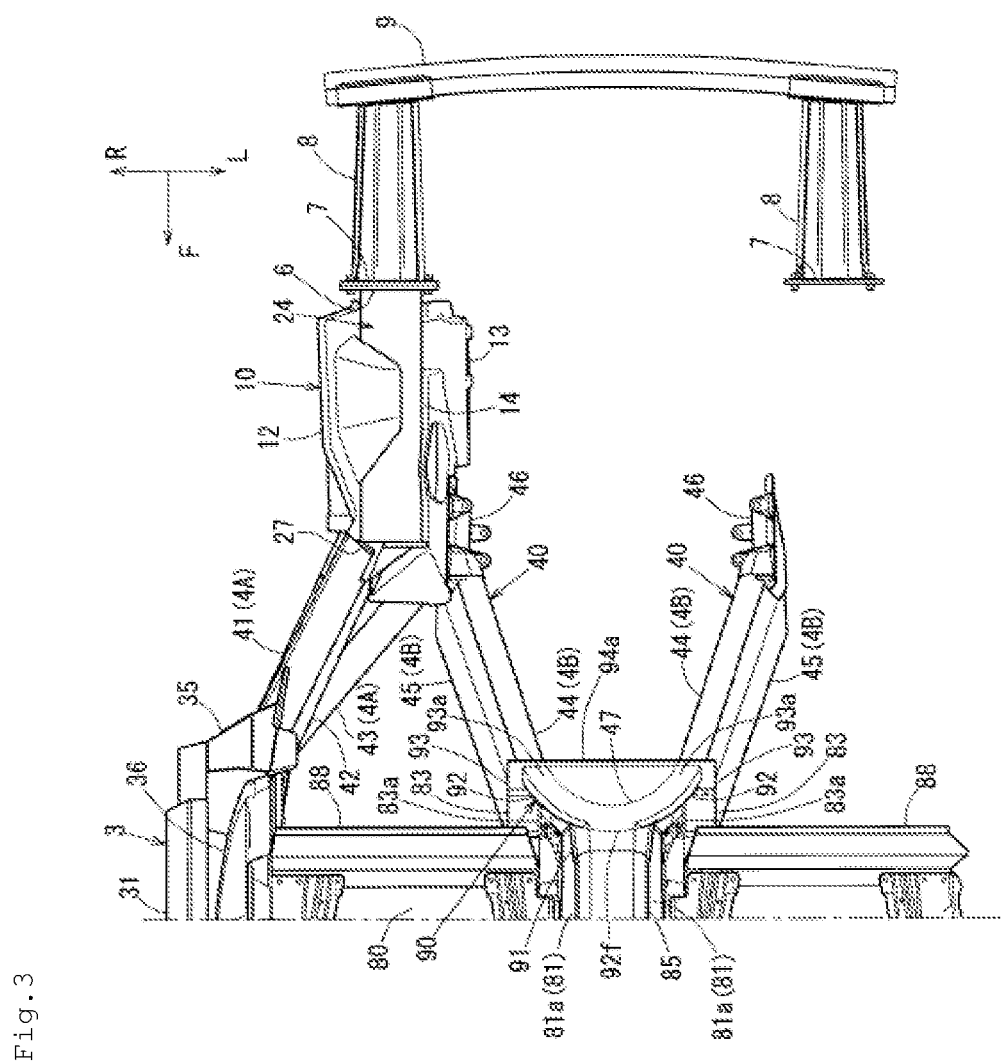
FIG. 3 is a plan view of a rear side of the vehicle as viewed from an upper side in FIG. 1.

As shown in FIGS. 3 and 4, each of the left and right side walls 81a of the floor tunnel 81 is integrally formed at its rear end (83a) with a lateral flange portion 83 protruding toward the vehicle-width-direction outer side via a bent portion 83a.

As shown in FIGS. 1 to 4, a backbone frame 85 is disposed on the top deck portion 81b of the floor tunnel 81.

The backbone frame 85 is an extruded member having therein a closed cross-sectional space extending in the vehicle front-rear direction. As shown in FIGS. 1 to 3, the backbone frame 85 extends toward the vehicle rear side until its rear end almost reaches the rear end of the floor tunnel 81 and, as shown in FIG. 1, extends toward the vehicle front side with a front portion 85f of the floor tunnel 81 bifurcated in vehicle plan view such that the bifurcated front portions 85f are more apart from each other in the vehicle width direction as they go toward the vehicle front side. These bifurcated front portions 85f of the backbone frame 85 are respectively joined to vehicle-body rigidity members (not shown) that extend in the vehicle front-rear direction at the vehicle front side of a dash lower panel (not shown).

As shown in FIGS. 1 to 5, a connecting bracket 90 is provided above the rear end of the floor tunnel 81, namely at the rear end of the backbone frame 85. As shown in FIGS. 1 and 2, the connecting bracket 90 is disposed on the top deck portion 81b at the rear end of the floor tunnel 81 in a slanted orientation such that the connecting bracket 90 is higher at its front portion than its rear portion, similarly to the backbone frame 85.

The connecting bracket 90 is integrally formed of a base portion 91 joined to the rear end of the backbone frame 85 and a vehicle-width-center upper joined portion 92 to which a connecting portion 47 of a left-right integrated frame member 40 (described later; see FIGS. 1 to 5) is joined.

The vehicle-width-center upper joined portion 92 is formed such that its width in the vehicle width direction gradually increases outward from a rear end of the base portion 91 toward the vehicle rear side and, as shown in FIG. 4, formed at its rear end with an opening 92A opened rearward.

As shown in FIG. 3, the vehicle-width-center upper joined portion 92 is formed so as to be able to accommodate the connecting portion 47 of the left-right integrated frame member 40 (described later) via the opening 92A, and a rear face of a front wall 92f of the vehicle-width-center upper joined portion 92 is formed in a curved shape in vehicle plan view to conform to a curved shape of the connecting portion 47.

As shown in FIG. 4, a rear end of the connecting bracket 90, namely the rear end of the vehicle-width-center upper joined portion 92 includes a pair of left and right rear end side edges (93a) extending in the vehicle up-down direction and a rear end upper edge (94a) connecting upper ends of the pair of left and right rear end side edges in the vehicle width direction; theses edges define the aforementioned opening 92A.

The connecting bracket 90 is integrally formed with the lateral flange portions 93 protruding toward the vehicle-width-direction outer side respectively from the left and right rear end side edges (93a) each via a bent portion 93a. The connecting bracket 90 is integrally formed with an upper flange portion 94 protruding toward the vehicle upper side from the rear end upper edge (94a) via a bent portion 94a.

The lateral flange portions 93 formed at the rear end side edges (93a) of the connecting bracket 90 and the lateral flange portions 83 formed at the rear ends (83a) of the side walls (81a) of the floor tunnel 81 are disposed in an upper and lower relationship so as to extend in the vehicle up-down direction on the left and right sides.

As shown in FIGS. 1 to 3 and 5, a side sill 3 extending in the vehicle front-rear direction is joined and fixed to each of the left and right sides of the aforementioned floor panel 80.

As shown in FIGS. 1, 3, and 6, the side sill 3 is an aluminum alloy extruded member formed by extrusion and is disposed in the vehicle front-rear direction on each side of the floor panel 80.

As shown in FIG. 6, the side sill 3 is formed of closed cross-section portions 31, 32 disposed spaced apart from each other in an upper and lower relationship and a connecting wall 33 connecting these closed cross-section portions 31, 32 on upper and lower sides.

Both of the closed cross-section portions 31, 32 on upper and lower sides (each of the upper closed cross-section portion 31 and the lower closed cross-section portion 32) have therein a closed cross-sectional space extending along the entire length of the side sill 3 in the vehicle front-rear direction.

A hinge pillar 34 extending in the vehicle up-down direction is disposed in a standing manner at a front end of the side sill 3. As shown in FIG. 6, the hinge pillar 34 is an aluminum alloy extruded member formed by extrusion so as to have therein a closed cross-section portion extending linearly in the vehicle up-down direction, and is disposed in a standing manner on the lower closed cross-section portion 32 such that the hinge pillar 34 projects from the upper closed cross-section portion 31 toward the vehicle upper side in a slanted orientation that positions the hinge pillar 34 closer to the vehicle front side as it goes toward the vehicle upper side. The hinge pillar 34 is integrally joined, by arc welding or the like, to the upper closed cross-section portion 31, the connecting wall 33, and the lower closed cross-section portion 32 at its respective portions facing them.

A rear pillar 35 (C pillar) extending in the vehicle up-down direction is disposed in a standing manner at a rear end of the side sill 3. The rear pillar 35 is an aluminum alloy extruded member formed by extrusion so as to have therein a closed cross-sectional space extending linearly in the vehicle up-down direction, and is disposed in a standing manner on the lower closed cross-section portion 32 such that the rear pillar 35 projects from the upper closed cross-section portion 31 toward the vehicle upper side in a slanted orientation that positions the rear pillar 35 closer to the vehicle rear side as it goes toward the vehicle upper side. The rear pillar 35 is integrally joined, by arc welding or the like, to the upper closed cross-section portion 31, the connecting wall 33, and the lower closed cross-section portion 32 at its respective portions facing them.

In the following description, the side sill 3 and the rear pillar 35 integrally joined to each other may also be referred to as a combined body 30. In FIG. 6, reference numerals 36a, 36b denote rear pillar reinforcements that reinforce the rear pillar 35 itself and joined portions of the rear pillar 35 and the side sill 3.

As shown in FIG. 1, floor cross members 87, 88 are disposed on the floor panel 80 between the side sill 3 and the side wall 81a of the floor tunnel 81 such that floor cross members 87, 88 extend linearly in the vehicle width direction so as to connect the side sill 3 and the side wall 81a.

The floor cross members 87, 88 include an intermediate floor cross member 87 disposed substantially at an intermediate position on the floor panel 80 in the vehicle front-rear direction and a rear end floor cross member 88 disposed at a rear end position on the floor panel 80 in the vehicle front-rear direction.

The intermediate floor cross member 87 has a hat-shaped profile whose cross-section perpendicular to the vehicle width direction opens downward (see FIG. 2) and forms a closed cross-sectional space between the intermediate floor cross member 87 and the top face of the floor panel 80. The rear end floor cross member 88 is formed by extrusion and forms therein a closed cross-sectional space.

In this example, a vehicle-width-direction outer end of the rear end floor cross member 88 is joined, from the vehicle-width-direction inner side and by arc welding, to a lower portion of the rear pillar 35 joined to the rear end of the side sill 3, namely a joined portion of the rear pillar 35 at which the rear pillar 35 is joined to the rear end of the lower closed cross-section portion 32 (see FIG. 1). Meanwhile, a vehicle-width-direction inner end of the rear end floor cross member 88 is joined, from the vehicle-width-direction outer side and by arc welding, to a rear lower portion of the corresponding left or right side wall 81a of the floor tunnel 81 (see FIG. 1).

As shown in FIGS. 1 and 2, the rear portion of the vehicle of the present embodiment includes, on each of the left and right sides thereof, a rear side frame 1, a rear side housing 10, and connecting frames 4A, 4B.

The rear side frame 1 is an aluminum alloy extruded member formed by extrusion and formed in a cylindrical shape with a substantially rectangular closed cross-section linearly extended in the vehicle front-rear direction. On each side of the vehicle-body rear portion, the rear side frame 1 extends in the vehicle-front rear direction from the front side of the rear side housing 10 so as to project toward the vehicle rear side farther than a rear end of the rear side housing 10 and is disposed substantially parallel to the vehicle front-rear direction.

Each front end of a pair of left and right crash cans 8 that are composed of a cylindrical body and the like for absorbing impact of a collision is connected to a rear end of the rear side frame 1 via a set plate 6 and a mounting plate 7. Rear ends of the pair of left and right crash cans 8 are connected by a bumper reinforcement 9.

The rear side housing 10 is disposed to substantially overlap the rear suspension (not shown) in vehicle side view so that the rear side housing 10 can support the rear suspension from the vehicle-width-direction inner side, and is manufactured by die-casting of aluminum alloy, for example. As shown in FIGS. 1 and 3, the rear side housing 10 is disposed spaced apart from the side sill 3 toward the vehicle rear side and toward the vehicle-width-direction inner side.

Specifically, as shown in FIGS. 1 to 5, the rear side housing 10 includes an upper raised wall 12, a lower raised wall 13 at a position spaced apart from the upper raised wall 12 toward the vehicle-width-direction inner side, and a step portion 14 extending substantially horizontally in the vehicle width direction so as to connect an upper end of the upper raised wall 12 and a lower end of the lower raised wall 13 in the vehicle width direction. As shown in FIGS. 1 to 3, the rear side frame 1 is disposed at a corner portion 24 between the upper raised wall 12 and the step portion 14 of the rear side housing 10.

As shown in FIG. 6, a lower arm front support portion 21a and a lower arm rear support portion 21b for pivotably supporting a lower arm (not shown) that is A-shaped in plan view are provided at a lower portion of the rear side housing 10.

The lower arm front support portion 21a pivotably supports a vehicle-width-direction inner end of the lower arm on the vehicle front side, and the lower arm rear support portion 21b pivotably supports a vehicle-width-direction inner end of the lower arm on the vehicle rear side. The lower arm front support portion 21a and the lower arm rear support portion 21b are provided spaced apart from each other in the vehicle front-rear direction at a lower portion of the lower raised wall 13 of the rear side housing 10.

An upper arm support portion 22 for pivotably supporting a vehicle-width-direction inner end of an upper arm (not shown) that is I-shaped in plan view is provided at a position that is in the middle of the rear side housing 10 in the vehicle up-down direction and in the vehicle front side thereof, namely in the front side of the lower portion of the upper raised wall 12 of the rear side housing 10.

In an upper portion of the rear side housing 10, namely at an intermediate position in an upper portion of the upper raised wall 12 of the rear side housing 10 in the vehicle front-rear direction, there is provided a damper support portion 23 for pivotably supporting an upper end of a rear suspension damper (not shown) that extends in the vehicle up-down direction in a slanted orientation such that the rear suspension damper is positioned closer to the vehicle-width-direction inner side as it goes toward the vehicle upper side.

A front portion of the rear side housing 10 is configured such that rear ends of three vehicle width outer connecting frames 4A (described later) (see FIG. 6) may be joined to the front portion from a vehicle-width-direction outer face side.

Specifically, as shown in FIG. 6, in the front portion of the rear side housing 10 and at the intermediate position thereof in the vehicle up-down direction, there is provided a first upper outer frame rear end joined portion 27 to which a rear end of a first upper outer frame 41 (described later) located at the uppermost position among the three vehicle width outer connecting frames 4A (described later) is joined.

In the front portion of the rear side housing 10 and at the intermediate position thereof in the vehicle up-down direction, there is provided a second upper outer frame rear end joined portion 28 to which a rear end of a second upper outer frame 42 (described later) located between other two vehicle width outer connecting frames 41, 43 in the vehicle up-down direction among the three vehicle width outer connecting frames 4A (described later) is joined.

In the front lower portion of the rear side housing 10, there is provided a lower outer frame rear end joined portion 29 to which a rear end of a lower outer frame 43 located at the lowermost position among the three vehicle width outer connecting frames 4A (described later) is joined.

As described above, the first upper outer frame rear end joined portion 27 and the second upper outer frame rear end joined portion 28 are provided adjacent to each other in an upper and lower relationship near the front side of the upper arm support portion 22 of the rear side housing 10.

Meanwhile, directly below and near the lower arm front support portion 21a, the lower outer frame rear end joined portion 29 is provided substantially at the same height as the lower arm front support portion 21a and the lower arm rear support portion 21b.

The upper raised wall 12, the lower raised wall 13, and the step portion 14 of the aforementioned rear side housing 10 are integrally formed and made of aluminum alloy as a single member. In other words, as described above, almost entirety of the rear side housing 10, including the lower arm support portions 21a, 21b, the upper arm support portion 22, the damper support portion 23, the first upper outer frame rear end joined portion 27, the second upper outer frame rear end joined portion 28, and the lower outer frame rear end joined portion 29, is integrally formed of a single member by die-casting of aluminum alloy.

Now a description will be given of the connecting frames 4A, 4B. As shown in FIGS. 1 to 5, the connecting frames 4A, 4B include the vehicle width outer connecting frames 4A (41, 42, 43) located between a rear end of the combined body 30 and the rear side housing 10 and connecting them, and vehicle width inner connecting frames 4B (44, 45) located between the rear end of the floor tunnel 81 and the rear side housing 10 and connecting them.

As shown in FIG. 6, multiple vehicle width outer connecting frames 4A are provided spaced apart from each other in the vehicle up-down direction.

Specifically, on each of the left and right sides of the vehicle-body rear portion, the vehicle width outer connecting frames 4A include the three frames of the first upper outer frame 41, the second upper outer frame 42, and the lower outer frame 43 disposed in this order from the vehicle upper side to the vehicle lower side.

The first upper outer frame 41 is disposed substantially horizontally at a position slightly higher than the upper arm support portion 22. A front end of the first upper outer frame 41 is joined to the rear pillar 35 from a rear face of the rear pillar 35 at a position thereof on the vehicle upper side relative to an upper end of the side sill 3. The rear end of the first upper outer frame 41 is joined to the aforementioned first upper outer frame rear end joined portion 27 of the rear side housing 10 from the vehicle-width-direction outer face side.

The second upper outer frame 42 extends in a slanted manner in vehicle side view such that it is positioned closer to the vehicle upper side as it goes toward the vehicle rear side. A front end of the second upper outer frame 42 is joined to the rear pillar 35 from the rear face of the rear pillar 35 at a position thereof corresponding to the rear end of the upper closed cross-section portion 31 in the vehicle up-down direction of the side sill 3. The rear end of the second upper outer frame 42 is joined to the aforementioned second upper outer frame rear end joined portion 28 of the rear side housing 10 from the vehicle-width-direction outer face side.

The lower outer frame 43 is disposed horizontally in side view at a position on the rear pillar 35 corresponding to the lower closed cross-section portion 32 of the side sill 3 and below the lower arm front support portion 21a. A front end of the lower outer frame 43 is joined to a rear end of the lower closed cross-section portion 32 of the side sill 3. The rear end of the lower outer frame 43 is joined to the aforementioned lower outer frame rear end joined portion 29 of the rear side housing 10 from the vehicle-width-direction outer face side.

As shown in FIG. 3, the aforementioned three vehicle width outer connecting frames 4A (41, 42, 43) linearly extend in a slanted manner such that they are positioned closer to the vehicle-width-direction inner side as they go toward the vehicle rear side, and are integrally joined to both of the combined body 30 and the rear side housing 10 by MIG welding for example.

Multiple vehicle width inner connecting frames 4B are provided spaced apart from each other in the vehicle up-down direction.

Specifically, on each of the left and right sides of the vehicle-body rear portion, the vehicle width inner connecting frames 4B include an upper inner frame 44 and a lower inner frame 45 respectively disposed on the vehicle upper and lower sides.

As shown in FIGS. 1 to 5, rear ends of both of the upper inner frame 44 and the lower inner frame 45 are joined to the rear side housing 10 via a frame mounting bracket 46 from a vehicle-width-direction inner face side at a position overlapping the lower arm front support portion 21a (see FIG. 6) in vehicle side view.

A rear end of the upper inner frame 44 and a rear end of the lower inner frame 45 are respectively joined to an upper portion and a lower portion of the frame mounting bracket 46 at positions adjacent to each other.

A front end of the upper inner frame 44 and a front end of the lower inner frame 45 are respectively joined to a rear end upper portion (portion corresponding to the connecting bracket 90) and a rear end lower portion of the floor tunnel 81.

Both of the aforementioned vehicle width inner connecting frames 4B (44, 45) linearly extend in a slanted manner such that they are positioned closer to the vehicle-width-direction outer side as they go toward the vehicle rear side. As shown in FIG. 2, out of the two vehicle width inner connecting frames 4B, the lower inner frame 45 extends horizontally in vehicle side view while the upper inner frame 44 extends in a slanted manner such that it is positioned upward as it goes toward the vehicle front side.

Conforming to this, the backbone frame 85 and the connecting bracket 90 are disposed in a slanted manner such that they are positioned upward as they go toward the vehicle front side as described above, which makes their inclination angles as much closer as possible to those of the pair of left and right upper inner frames 44 in vehicle side view.

Figure 5:
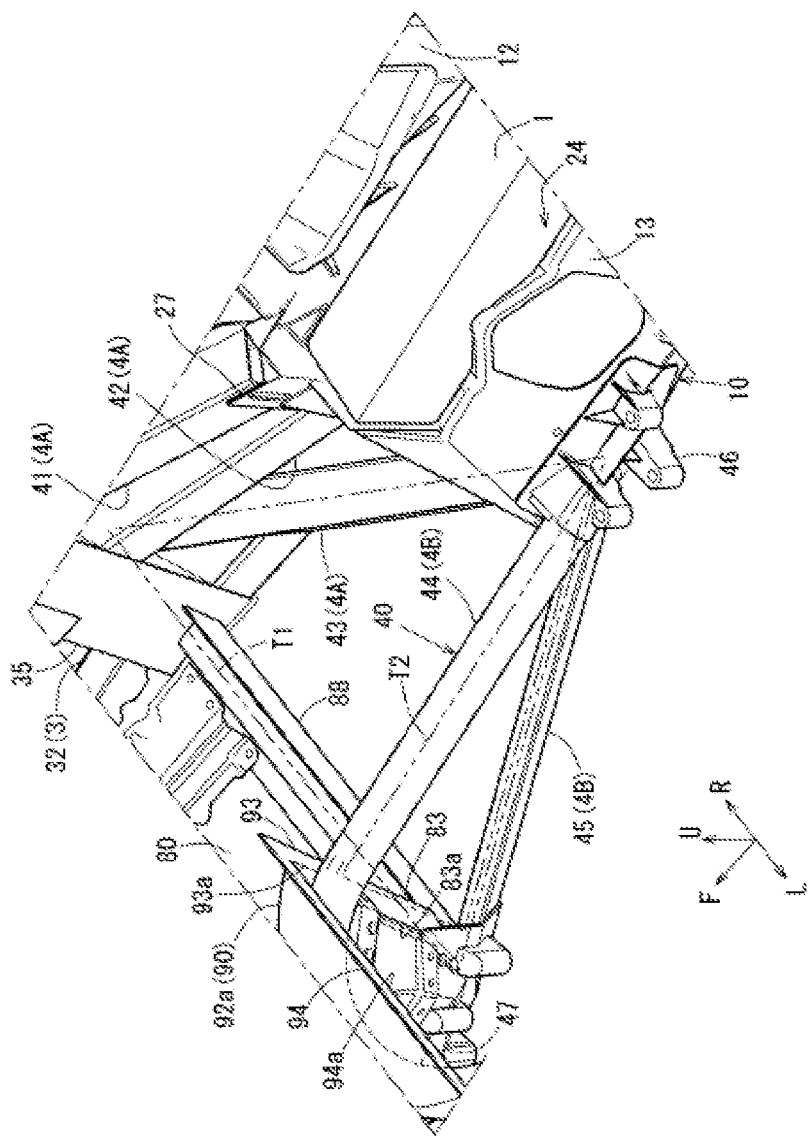
FIG. 5 is an enlarged view of a region X in FIG. 1.
Figure 6:
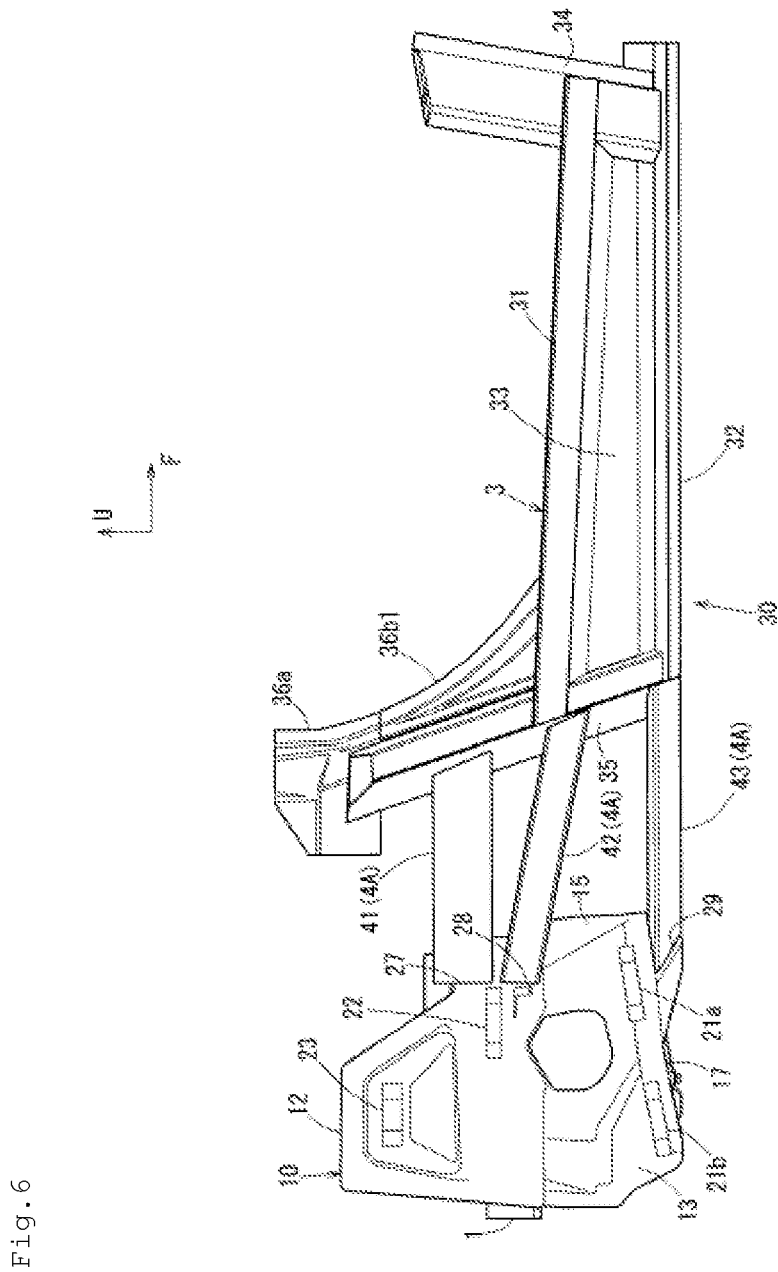
FIG. 6 is a right side view of major parts of the vehicle having the rear vehicle-body structure of the present embodiment.

As shown in FIGS. 1, 3, and 5, a position where the front end of the lower inner frame 45 and the rear end lower portion of the floor tunnel 81 are joined substantially coincides with a position where the vehicle-width-direction inner end of the rear end floor cross member 88 and the rear end lower portion of the floor tunnel 81 are joined. Also, a position where the front end of the lower outer frame 43 and a rear end lower portion of the combined body 30 are joined substantially coincides with a position where the vehicle-width-direction outer end of the rear end floor cross member 88 and the rear end lower portion of the combined body 30 are joined.

Further, as shown in FIGS. 1 to 5, the frame mounting bracket 46 and the lower outer frame rear end joined portion 29 are provided respectively on inner and outer sides of the rear side housing 10 in the vehicle width direction but at portions substantially overlapping each other in vehicle side view.

Hence, as shown in FIG. 5, the rear end floor cross member 88, the lower inner frame 45, and the lower outer frame 43 constitute a first truss structure T1. The first truss structure T1 is provided in a plane perpendicular to the vehicle up-down direction and rearwardly adjacent to the floor panel 80.

Also, floor tunnel rear end side edge portions (83a, 93a) (i.e., a rear end side edge (83a) of the side wall 81a of the floor tunnel 81 and a rear end side edge (93a) of the connecting bracket 90), the upper inner frame 44, and the lower inner frame 45 constitute a second truss structure T2. The second truss structure T2 is provided in an upright orientation like the first truss structure T1 being pivoted upward around the lower inner frame 45, and is provided in a plane substantially perpendicular to the vehicle width direction.

Here, the floor tunnel rear end side edge portions (83a, 93a) extend in the vehicle up-down direction, including the corresponding left or right side wall rear end of the backbone frame 85. In other words, the lateral flange portion 83 of the floor tunnel 81 and the lateral flange portion 93 of the connecting bracket 90 extend linearly in the vehicle up-down direction so as to connect front ends of the upper inner frame 44 and the lower inner frame 45. Additionally, the lateral flange portion 83 and the lateral flange portion 93 are integrally formed, at their base ends, with the bent portions 83a, 93a (ridges), respectively, extending in the vehicle up-down direction.

Thus, the lateral flange portion 83 and the lateral flange portion 93 connect the front ends of the upper inner frame 44 and the lower inner frame 45 while ensuring strength between these front ends.

As shown in FIGS. 1, 3, and 4, in this example, the aforementioned pair of left and right upper inner frames 44 are formed as part of the left-right integrated frame member 40. Specifically, the left-right integrated frame member 40 is formed by extrusion of a single member, such as aluminum alloy, into a cylindrical shape over its entire length, and is integrally formed in a substantially U-shape as a whole by bending a center portion in the longitudinal direction of the single member in an arc shape (circular arc shape in this example) such that the center portion projects frontward. The left-right integrated frame member 40 is integrally formed of the pair of linearly extending left and right upper inner frames 44 and an arc-shaped connecting portion 47 connecting their front ends.

The left-right integrated frame member 40 is disposed rearward of the floor tunnel 81 such that the connecting portion 47 projects frontward. In other words, the left-right integrated frame member 40 is disposed such that the connecting portion 47 is inserted into the vehicle-width-center upper joined portion 92 of the connecting bracket 90 via the opening 92A.

At this time, the front wall 92f of the vehicle-width-center upper joined portion 92 of the connecting bracket 90 is formed in an arc shape conforming to the arc-shaped connecting portion 47, as described above. Hence, the connecting portion 47 inserted into the vehicle-width-center upper joined portion 92 of the connecting member has its front edge abutting on the rear face of the front wall 92f of the vehicle-width-center upper joined portion 92 of the connecting bracket 90 in the vehicle width direction and is integrally joined by arc welding along the abutting portion. This allows for connecting the vehicle-width-center upper joined portion 92 of the connecting bracket 90 and the connecting portion 47 such that the vehicle-width-center upper joined portion 92 receives, on its rear side, the connecting portion 47 over the almost entire length thereof in the vehicle width direction.

In this way, the left-right integrated frame member 40 can have its pair of left and right upper inner frames 44 joined to the rear end upper portions of the left and right side walls 81a of the floor tunnel 81 by having its connecting portion 47 joined to the connecting bracket 90.

This allows load that is input to the rear side housing 10 from the lower arm of the rear suspension via the lower arm support portions 21a, 21b during traveling of the vehicle to be transmitted to the backbone frame 85 from the upper inner frame 44 via the connecting bracket 90.

As shown in FIG. 1, the rear vehicle-body structure of the vehicle of the present embodiment described above includes: the rear side housing 10 provided with the lower arm support portions 21a, 21b (see FIG. 6) for supporting the lower arm (not shown) of the rear suspension; the side sill 3 extending in the vehicle front-rear direction on each side of a vehicle-body bottom portion disposed on the vehicle front side relative to the rear side housing 10; the rear pillar 35 (pillar) extending in the vehicle up-down direction and having its lower portion joined to the side sill 3; and the floor tunnel 81 located at the vehicle-width-direction center portion of the vehicle-body bottom portion and bulging from the vehicle-body bottom portion toward the vehicle upper side and extending in the vehicle front-rear direction. As shown in FIGS. 1, and 3 to 5, the rear vehicle-body structure includes: the lower outer frame 43 (the first frame) extending so as to connect the rear end lower portion of the combined body 30, which is composed of the side sill 3 and the rear pillar 35, and the lower arm front support portion 21a of the rear side housing 10 and having therein a closed cross-sectional space in the longitudinal direction (extending direction); the lower inner frame 45 (the second frame) extending so as to connect the rear end lower portion of the floor tunnel 81 and the lower arm front support portion 21a and having therein a closed cross-sectional space in the longitudinal direction; and the upper inner frame 44 (the third frame) extending so as to connect the rear end upper portion of the floor tunnel 81 and the lower arm front support portion 21a and having therein a closed cross-sectional space in the longitudinal direction.

With the above configuration, load in the vehicle front-rear direction and in the vehicle width direction that is included in the load input to the rear side housing 10 via the lower arm support portions 21a, 21b during traveling of the vehicle can be received by the virtual truss structure having the lower outer frame 43 and the lower inner frame 45, and also load in the vehicle up-down direction that is included in the above load input to the rear side housing 10 can be received by the virtual truss structure (T2) having the lower inner frame 45 and the upper inner frame 44 (see FIG. 5).

Thus, the above configuration can increase support rigidity for the lower arm support portions 21a, 21b, to which a larger load is input than to the upper arm support portion during traveling of the vehicle.

In one aspect of the present disclosure, as shown in FIG. 3, the floor tunnel rear end side edge portions (83a, 93a) are provided on each side in the vehicle width direction of the rear end of the floor tunnel 81. The floor tunnel rear end side edge portions (83a, 93a) extend in the vehicle up-down direction so as to connect the rear end upper portion and the rear end lower portion of the floor tunnel 81, and as shown in FIG. 5, the floor tunnel rear end side edge portions (83a, 93a), the lower inner frame 45, and the upper inner frame 44 constitute the second truss structure T2 (truss structure).

The above configuration can further increase support rigidity particularly against load in the vehicle up-down direction that is included in the load input to the rear side housing 10 via the lower arm support portions 21a, 21b during traveling of the vehicle.

More specifically, with the above configuration, the floor tunnel rear end side edge portions (83a, 93a) have an end shape in the vehicle up-down direction that protrudes toward the vehicle rear side. In particular, in this example, the lateral flange portions 83, 93 protruding toward the vehicle-width-direction outer side via the bent portions 83a, 93a are provided at the rear end of the side wall 81a of the floor tunnel 81.

Thus, the floor tunnel rear end side edge portions (83a, 93a) are formed with ridge portions in the vehicle up-down direction that correspond to the bent portions 83a, 93a. Additionally, as shown in FIG. 3, the rear end of the floor tunnel 81, including the rear end of the connecting bracket 90, is formed in a gate shape (U-shape) in vehicle front view. Specifically, the floor tunnel rear end side edge portions (83a, 93a) are formed such that upper ends thereof are connected by the rear end upper edge (94a) of the connecting bracket 90 in the vehicle width direction, and the bent portions 83a, 93a, 94a (ridge portions) are formed over the entire rear end of the floor tunnel 81.

Meanwhile, lower ends of the pair of left and right side wall rear ends are respectively integrally connected to vehicle-width-direction inner ends of the left and right rear end floor cross members 88. This gives a higher rigidity to the floor tunnel rear end side edge portions (83a, 93a) as compared to their nearby parts.

In the present embodiment, the second truss structure T2 can be constituted by the lower inner frame 45, the upper inner frame 44, and the floor tunnel rear end side edge portions (83a, 93a) connecting the rear ends of these frames 45, 45 in the vehicle up-down direction.

Therefore, as described above, the rear vehicle-body structure of the vehicle of the present embodiment can have a further increased support rigidity particularly against load in the vehicle up-down direction included in the load that is input to the rear side housing 10 via the lower arm support portions 21a, 21b during traveling of the vehicle.

In one aspect of the present disclosure, as shown in FIGS. 1 and 3 to 5, the rear vehicle-body structure includes the rear end floor cross member 88 (cross member) extending in the vehicle width direction so as to connect the rear end lower portion of the floor tunnel 81 and the rear end lower portion of the combined body 30 and having therein a closed cross-sectional space in the vehicle width direction (extending direction), and as shown in FIG. 5, the rear end floor cross member 88, the lower outer frame 43, and the lower inner frame 45 constitute the first truss structure T1 (truss structure).

The above configuration can further increase support rigidity particularly against load in the vehicle front-rear direction and in the vehicle width direction that is included in the load input from the lower arm to the rear side housing 10 via the lower arm support portions 21a, 21b during traveling of the vehicle.

In the present embodiment, the aforementioned two truss structures T1, T2 have the lower inner frame 45 in common as part of their components. This can effectively increase the support rigidity for the lower arm support portions 21a, 21b without adding weight to the vehicle body.

In one aspect of the present disclosure, as shown in FIGS. 1, 2, and 4, the pair of left and right upper inner frames 44 are provided in the left-right integrated frame member 40, and the left-right integrated frame member 40 is formed of a single member.

With this configuration, the left-right integrated frame member 40 is formed of a single member, which allows the left-right integrated frame member 40 to be formed without providing a joining portion for joining the pair of left and right upper inner frames 44. Hence, this allows the load that is input from the lower arm to the lower arm support portions 21a, 21b during traveling of the vehicle to be effectively transmitted toward the vehicle front side via the left-right integrated frame member 40.

On the top deck portion 81b (top face) of the floor tunnel 81, the backbone frame 85 extending in the vehicle front-rear direction along the top deck portion 81b is disposed, and the front end of the left-right integrated frame member 40 is connected to the rear end of the backbone frame 85.

The above configuration allows the load that is input from the lower arm of the rear suspension to the lower arm support portions 21a, 21b during traveling of the vehicle to be transmitted to the backbone frame 85 from the left-right integrated frame member 40.

In one aspect of the present disclosure, the left-right integrated frame member 40 includes the connecting portion 47 connecting the front ends of the pair of left and right upper inner frames 44 in the vehicle width direction. The connecting portion 47 is formed in a curved shape with its center portion in the vehicle width direction being curved toward the vehicle front side in vehicle plan view. The connecting portion 47 of the left-right integrated frame member 40 is supported by the rear end of the floor tunnel 81 via the connecting bracket 90 (bracket). The connecting bracket 90 includes the front wall 92f (receiving portion) for receiving the connecting portion 47, and the front wall 92f is formed in a curved shape conforming to the curved shape of the connecting portion 47.

With the above configuration, the connecting portion 47 is formed in the curved shape and the front wall 92f is formed in a curved shape conforming to that curved shape, and this allows the rear face of the front wall 92f to firmly receive the connecting portion 47 while being in contact therewith along the curved shape.

The present disclosure is not limited to the configuration of the above embodiment and may be implemented in various embodiments.

What is claimed is:

1. A rear vehicle-body structure of a vehicle, the rear vehicle-body structure comprising:
    a rear side housing provided with a lower arm support portion for supporting a lower arm of a rear suspension;
    a side sill extending in a vehicle front-rear direction on each side of a vehicle-body bottom portion disposed on a vehicle front side relative to the rear side housing;
    a pillar extending in a vehicle up-down direction and having a lower portion thereof joined to the side sill;
    a floor tunnel located at a vehicle-width-direction center portion of the vehicle-body bottom portion and bulging from the vehicle-body bottom portion toward a vehicle upper side and extending in the vehicle front-rear direction;
    a first frame extending so as to connect the lower arm support portion and a rear end lower portion of a combined body composed of the side sill and the pillar, the first frame having therein a closed cross-sectional space in an extending direction of the first frame;
    a second frame extending so as to connect a rear end lower portion of the floor tunnel and the lower arm support portion, the second frame having a closed cross-section portion in an extending direction of the second frame; and
    a third frame extending so as to connect a rear end upper portion of the floor tunnel and the lower arm support portion, the third frame having a closed cross-section portion in an extending direction of the third frame.

2. The rear vehicle-body structure of a vehicle according to claim 1, further comprising:
    a floor tunnel rear end side edge portion on each side in a vehicle width direction of a rear end of the floor tunnel, wherein
    the floor tunnel rear end side edge portion extends in the vehicle up-down direction so as to connect the rear end upper portion and the rear end lower portion of the floor tunnel, and
    the floor tunnel rear end side edge portion, the second frame, and the third frame constitute a truss structure.

3. The rear vehicle-body structure of a vehicle according to claim 2, further comprising:
    a cross member extending in the vehicle width direction so as to connect the rear end lower portion of the floor tunnel and the rear end lower portion of the combined body and having therein a closed cross-sectional space in the vehicle width direction, wherein
the cross member, the first frame, and the second frame constitute a truss structure.

4. The rear vehicle-body structure of a vehicle according to claim 3, wherein
a pair of left and right third frames are provided in a left-right integrated frame member, and
the left-right integrated frame member is formed of a single member.

5. The rear vehicle-body structure of a vehicle according to claim 4, wherein
a backbone frame is disposed on a top face of the floor tunnel, the backbone frame extending in the vehicle front-rear direction along the top face, and
a front end of the left-right integrated frame member is connected to a rear end of the backbone frame.

6. The rear vehicle-body structure of a vehicle according to claim 5, wherein
the left-right integrated frame member includes a connecting portion connecting front ends of the pair of left and right third frames in the vehicle width direction,
the connecting portion is formed in a curved shape with a center portion thereof in the vehicle width direction being curved toward the vehicle front side in vehicle plan view,
the connecting portion of the left-right integrated frame member is supported by a rear end of the floor tunnel via a bracket, and
the bracket includes a receiving portion for receiving the connecting portion, and the receiving portion is formed in a curved shape conforming to the curved shape of the connecting portion.

7. The rear vehicle-body structure of a vehicle according to claim 1, further comprising:
a cross member extending in the vehicle width direction so as to connect the rear end lower portion of the floor tunnel and the rear end lower portion of the combined body and having therein a closed cross-sectional space in the vehicle width direction, wherein
the cross member, the first frame, and the second frame constitute a truss structure.

8. The rear vehicle-body structure of a vehicle according to claim 1, wherein
a pair of left and right third frames are provided in a left-right integrated frame member, and
the left-right integrated frame member is formed of a single member.

9. The rear vehicle-body structure of a vehicle according to claim 2, wherein
a pair of left and right third frames are provided in a left-right integrated frame member, and
the left-right integrated frame member is formed of a single member.

10. The rear vehicle-body structure of a vehicle according to claim 4, wherein
the left-right integrated frame member includes a connecting portion connecting front ends of the pair of left and right third frames in the vehicle width direction,
the connecting portion is formed in a curved shape with a center portion thereof in the vehicle width direction being curved toward the vehicle front side in vehicle plan view,
the connecting portion of the left-right integrated frame member is supported by a rear end of the floor tunnel via a bracket, and
the bracket includes a receiving portion for receiving the connecting portion, and the receiving portion is formed in a curved shape conforming to the curved shape of the connecting portion.

11. The rear vehicle-body structure of a vehicle according to claim 7, wherein
a pair of left and right third frames are provided in a left-right integrated frame member, and
the left-right integrated frame member is formed of a single member.

12. The rear vehicle-body structure of a vehicle according to claim 8, wherein
a backbone frame is disposed on a top face of the floor tunnel, the backbone frame extending in the vehicle front-rear direction along the top face, and
a front end of the left-right integrated frame member is connected to a rear end of the backbone frame.

13. The rear vehicle-body structure of a vehicle according to claim 8, wherein
the left-right integrated frame member includes a connecting portion connecting front ends of the pair of left and right third frames in the vehicle width direction,
the connecting portion is formed in a curved shape with a center portion thereof in the vehicle width direction being curved toward the vehicle front side in vehicle plan view,
the connecting portion of the left-right integrated frame member is supported by a rear end of the floor tunnel via a bracket, and
the bracket includes a receiving portion for receiving the connecting portion, and the receiving portion is formed in a curved shape conforming to the curved shape of the connecting portion.

14. The rear vehicle-body structure of a vehicle according to claim 9, wherein
a backbone frame is disposed on a top face of the floor tunnel, the backbone frame extending in the vehicle front-rear direction along the top face, and
a front end of the left-right integrated frame member is connected to a rear end of the backbone frame.

15. The rear vehicle-body structure of a vehicle according to claim 9, wherein
the left-right integrated frame member includes a connecting portion connecting front ends of the pair of left and right third frames in the vehicle width direction,
the connecting portion is formed in a curved shape with a center portion thereof in the vehicle width direction being curved toward the vehicle front side in vehicle plan view,
the connecting portion of the left-right integrated frame member is supported by a rear end of the floor tunnel via a bracket, and
the bracket includes a receiving portion for receiving the connecting portion, and the receiving portion is formed in a curved shape conforming to the curved shape of the connecting portion.

16. The rear vehicle-body structure of a vehicle according to claim 11, wherein
a backbone frame is disposed on a top face of the floor tunnel, the backbone frame extending in the vehicle front-rear direction along the top face, and
a front end of the left-right integrated frame member is connected to a rear end of the backbone frame.

17. The rear vehicle-body structure of a vehicle according to claim 11, wherein the left-right integrated frame member includes a connecting portion connecting front ends of the pair of left and right third frames in the vehicle width direction, the connecting portion is formed in a curved shape with a center portion thereof in the vehicle width direction being curved toward the vehicle front side in vehicle plan view, the connecting portion of the left-right integrated frame member is supported by a rear end of the floor tunnel via a bracket, and the bracket includes a receiving portion for receiving the connecting portion, and the receiving portion is formed in a curved shape conforming to the curved shape of the connecting portion.

18. The rear vehicle-body structure of a vehicle according to claim 12, wherein the left-right integrated frame member includes a connecting portion connecting front ends of the pair of left and right third frames in the vehicle width direction, the connecting portion is formed in a curved shape with a center portion thereof in the vehicle width direction being curved toward the vehicle front side in vehicle plan view, the connecting portion of the left-right integrated frame member is supported by a rear end of the floor tunnel via a bracket, and the bracket includes a receiving portion for receiving the connecting portion, and the receiving portion is formed in a curved shape conforming to the curved shape of the connecting portion.

19. The rear vehicle-body structure of a vehicle according to claim 14, wherein the left-right integrated frame member includes a connecting portion connecting front ends of the pair of left and right third frames in the vehicle width direction, the connecting portion is formed in a curved shape with a center portion thereof in the vehicle width direction being curved toward the vehicle front side in vehicle plan view, the connecting portion of the left-right integrated frame member is supported by a rear end of the floor tunnel via a bracket, and the bracket includes a receiving portion for receiving the connecting portion, and the receiving portion is formed in a curved shape conforming to the curved shape of the connecting portion.

20. The rear vehicle-body structure of a vehicle according to claim 16, wherein the left-right integrated frame member includes a connecting portion connecting front ends of the pair of left and right third frames in the vehicle width direction, the connecting portion is formed in a curved shape with a center portion thereof in the vehicle width direction being curved toward the vehicle front side in vehicle plan view, the connecting portion of the left-right integrated frame member is supported by a rear end of the floor tunnel via a bracket, and the bracket includes a receiving portion for receiving the connecting portion, and the receiving portion is formed in a curved shape conforming to the curved shape of the connecting portion.

\* \* \* \* \*